United States Patent

[11] 3,614,584

| [72] | Inventors | Wilford B. Burkett<br>Pacific Palisades;<br>John H. Bigbee, III, Los Angeles, both of Calif. |
|---|---|---|
| [21] | Appl. No. | 21,430 |
| [22] | Filed | Mar. 20, 1970 |
| [45] | Patented | Oct. 19, 1971 |
| [73] | Assignee | McCullock Corporation<br>Los Angeles, Calif. |

[54] TERMINATION OF BATTERY CHARGING
14 Claims, 4 Drawing Figs.

[52] U.S. Cl.................................................. 320/35,
320/14, 320/20, 320/40
[51] Int. Cl................................................. H02j 7/10
[50] Field of Search............................................ 320/35, 36,
39, 40, 20–22, 53, DIG. 2, DIG. 1, 14

[56] References Cited
UNITED STATES PATENTS

| 2,957,117 | 10/1960 | Lapuyade..................... | 320/35 |
| 3,102,221 | 8/1963 | Harmen......................... | 320/36 |
| 3,102,222 | 8/1963 | Harmen......................... | 320/36 |
| 3,148,322 | 9/1964 | Booe et al...................... | 320/43 |
| 3,252,070 | 5/1966 | Medlar et al.................. | 320/SCR (UX) |
| 3,418,553 | 12/1968 | Potter............................ | 320/TD (UX) |
| 3,421,068 | 1/1969 | Van Marten.................. | 320/35 X |
| 3,454,860 | 7/1969 | Borkett et al................. | 320/40 X |
| 3,457,489 | 7/1969 | Gentry, Jr. et al............ | 320/35 X |
| 3,465,230 | 9/1969 | Ball................................ | 320/35 X |
| 3,534,241 | 10/1970 | Wilson et al.................. | 320/33 |

Primary Examiner—J. D. Miller
Assistant Examiner—John M. Gunther
Attorney—Christie, Parker & Hale ABSTRACT: A single cell or a plurality of cells are charged by applying a high-rate charge current and monitoring a terminal characteristic of the battery, such as terminal voltage or temperature, to effect termination of charge before damage occurs to the battery by a simple and relatively inexpensive circuit. The thermal characteristics of a rectifying means, such as a silicon controlled rectifier, are employed to effect termination in response to the attainment of a predetermined terminal characteristic by employing, for example, a circuit that clamps the control terminal of the rectifying means at a selected voltage, thereby making the charger sensitive to battery terminal voltage or a circuit that includes a thermistor mounted in thermal proximity with the battery and electrically connected between the control terminal of the rectifying means and the negative terminal of the battery, which makes the charger sensitive to battery temperature.

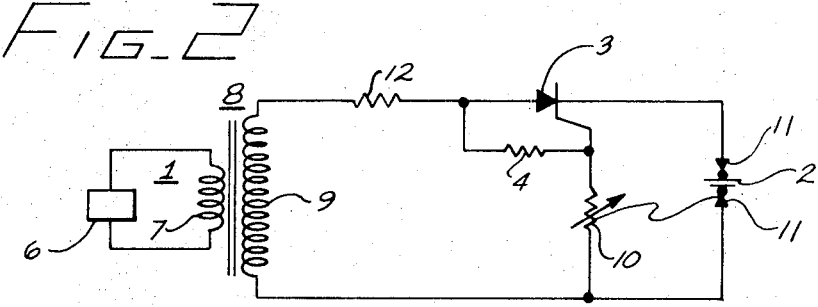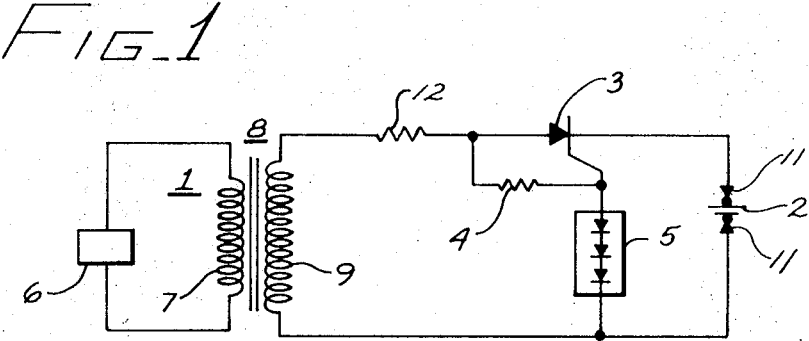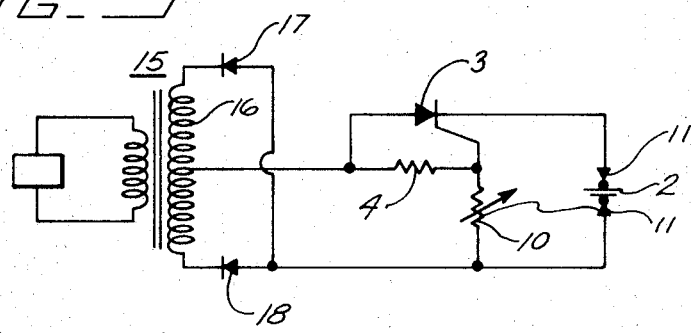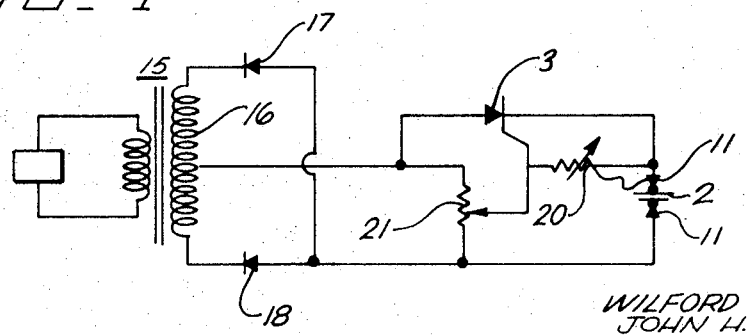

3,614,584

TERMINATION OF BATTERY CHARGING

BACKGROUND OF THE INVENTION

Field of the Invention

This invention relates to charging of batteries at a high rate and the prevention of damage to the battery by the high rate charge, which invention is particularly useful for the charging of single cells.

A method and circuit for charging batteries with a high charge rate to rated capacity or greater are disclosed in copending applications Ser. No. 612,995, filed Jan. 31, 1967, now U.S. Pat. No. 3,517,293 issued June 23, 1970; Ser. No. 836,791, filed June 26, 1969, and the concurrently filed application Ser. No. 21,438 filed Mar. 20, 1970, and entitled "Rapid Charging of Batteries."

By employing the circuits of the referred-to applications a battery may be charged to a selected charge state, which in many cases may be even greater than the rated capacity of the battery, in a very short period of time. In the method of charging of the referred-to applications a discharge interval is usually interspersed with charging intervals, during which the battery is discharged or depolarized, to enhance the ability of the battery to further accept a high rate charge. In these methods, the charge efficiency is relatively high. However, in certain applications the charge efficiency is not of primary concern; instead the primary concern for the charging system is the cost of the system. For example, in one particular application a charger is to be associated with toy electric cars of the type that run on tracks and that are powered by a single cell. For this application, it is sufficient that the charger partially restore the charge in the cell sufficient to run the cars in as little time and as for as little expense as possible. For such applications it is desirable to employ a high rate charge to decrease the time of charge. However, the charge must be terminated before any damage occurs to the cell which may be one of the most expensive elements in the toy.

Most of the present battery chargers are relatively complex and expensive and have circuit components that require a voltage that is not compatible with the nominal output voltage of a single cell for single-cell operation. In particular, charging single nickel cadmium cells poses some new problems not encountered with battery packs with two or more cells. For example, the cell terminal voltage at which rapid charging should be terminated to prevent damage to the cell must be sensed within closer tolerance ranges than the terminal voltages for multicell battery packs. Additionally, the other terminal characteristics of the battery, if sensed for termination of a high-rate charge, must be sensed within relatively small ranges.

SUMMARY OF THE INVENTION

In accordance with the present invention, the method of charging a battery of one or more cells at a high rate and terminating the charge in response to the attainment of a predetermined value of a selected terminal characteristic, which has a small range of variation, comprises the steps of applying charge current pulses through a rectifying means connected between a charging source and the battery to be charged and causing less current to flow through the rectifying means as a selected terminal characteristic of the battery increases as charge progresses and stopping all current flow after the attainment of a predetermined value of the sensed terminal characteristic.

The circuit for charging a battery of one or more cells in accordance with the present invention from a source of charging current pulses comprises a current path between the source and the battery to be charged with a unilateral impedance element connected in the path. The unilateral impedance element has a control terminal for the application of a triggering current to turn the element on for conduction of current therethrough. The unilateral impedance element is responsive to smaller trigger currents as its temperature increases, and conversely, requires larger trigger currents to turn on as its temperature decreases.

The circuit further includes circuit means for controlling the turn-on time of the unilateral impedance element relative to the zero crossing of the waveform of the source in response to a terminal characteristic, such as terminal voltage or temperature of the battery. Advantageously, the unilateral impedance element is a silicon controlled rectifier and the means for controlling the turn-on time of the silicon controlled rectifier is a forward reference diode connected between the gate of the rectifier and the negative terminal of the battery. The forward reference diode will clamp the gate of the silicon controlled rectifier at a predetermined voltage and the operation of the silicon controlled rectifier will thereafter be sensitive to the quiescent terminal voltage of the battery being charged. Alternatively, the means for controlling the turn-on time of the rectifier may advantageously be a thermistor electrically connected between the gate of the rectifier and the negative terminal of the battery, with the thermistor being mounted in thermal proximity to the battery so that it is responsive to the temperature of the battery, which temperature changes as charge progresses. The circuit employing a forward reference diode as a clamping device may advantageously be temperature and voltage compensated.

For purposes of compensation for different ambient temperatures in which the charger operates and for variations in input voltage, a small resistance is connected in the anode-cathode path of the silicon controlled rectifier and the forward reference diode, the silicon controlled rectifier and the small resistor are mounted in thermal proximity to each other.

BRIEF DESCRIPTION OF THE DRAWINGS

The above and other features and advantages of the present invention may be understood more fully and clearly upon consideration of the following specification and the drawings, in which:

FIG. 1 is a schematic diagram of the circuit for charging a battery in accordance with the present invention; and FIGS. 2, 3, and 4 are schematic diagrams of alternative embodiments of the present invention.

DESCRIPTION OF THE PREFERRED EMBODIMENT

The preferred embodiment of the circuit for charging a battery, and in particular a single cell, by applying a high-rate, pulsating charge current through a continuously operable electrical connection, including a controllable unilateral impedance element having a control terminal, and by decreasing the current flow through the controllable element in response to a terminal characteristic of the battery to cause the element to cool and the control of the element to decrease to a level where the controllable element will not conduct during subsequent positive halfwave from the source is shown schematically in FIG. 1 of the drawing.

The circuitry includes a source 1 of charge current pulses for charging a battery 2, which may be a single cell. The source 1 is connected to the battery 2 through a silicon controlled rectifier 3 having its anode-cathode path connected in the current path between the source 1 and battery 2. A trigger circuit for the silicon controlled rectifier 3 of a resistor 4 is connected between the anode and gate of the rectifier 3.

A means for controlling the firing angle of the silicon controlled rectifier 3 in response to the selected terminal characteristic of battery terminal voltage is provided. This control means includes a forward reference diode 5 connected between the gate of the rectifier 3 and the negative terminal of the battery 2.

The source 1 may include the commercial 115-volt alternating current source as schematically represented by block 6. Source 6 is connected to the primary 7 of a transformer 8 which is employed to step down the voltage to provide the proper voltage for the battery being charged. The secondary 9 of the transformer 8 is connected between the anode of the rectifier 3 and the negative terminal of the battery 2.

For illustrative purposes, it is assumed that the battery 2 to be charged is a single nickel cadmium ½ AA cell having a rated capacity of 125 milliampere hours and a nominal voltage of 1.2 volts. Such a cell is useful in powering toy electric cars of the type that run on tracks. Circuit components that have been found to be applicable in charging such a ⅛ AA nickel cadmium cell in accordance with this invention when the source 6 is the commercial 115-volt alternating current voltage, is as follows:

Transformer 8 has a turns ratio of approximately 12:1 to step down the voltage to approximately 10 volts r.m.s. open circuit.

The silicon controlled rectifier 3 is a Motorola 2N5060. The forward reference diode 5 is a Motorola MZ2362 and the resistor 4 is a 1,000-ohm resistor.

The exemplary cell having a nominal voltage of 1.2 volts and a nominal rate capacity of 125 milliampere hours when discharged at a rate of 125 milliamperes over a 10-hour period to a selected end voltage, has a C-rate of 125 milliamperes. The C-rate is the amperage of the current at which a cell has been discharged in rating the cell to a selected end voltage in a selected period of time.

The circuit operates as follows:

Upon the application of the source 6 and the attachment of the battery 2 (either one may occur first) silicon controlled rectifier 3 half-wave rectifies the alternating current voltage that appears across the secondary 9 of the transformer 8. When the voltage at the top terminal of the secondary 9 is more positive than the terminal voltage of the battery 2 the silicon controlled rectifier 3 will be forward biased and trigger current will flow through resistor 4 and the gate-cathode junction of silicon controlled rectifier 3. For a silicon controlled rectifier at ambient temperature of approximately 72° F. the gate must be more positive than the cathode by approximately five-tenths of a volt to cause the silicon controlled rectifier to turn on. The gate sensitivity of a silicon controlled rectifier varies as the temperature of the silicon controlled rectifier varies. In particular, the gate sensitivity increases as the temperature of the silicon controlled rectifier increases. That is, less trigger current or a smaller voltage between the gate and the cathode is required at higher temperatures. Conversely, more gate current or greater voltage differences between the gate and cathode is required at lower temperatures. This variation in sensitivity is advantageously employed in the circuit of the present invention to protect the cell by terminating the charging in response to the attainment of a predetermined value of a selected terminal characteristic of the cell.

In the exemplary circuit, the cell is charged with a current that has an average value of approximately 800 milliamperes which is substantially greater than the C-rate of the cell and constitutes a high-rate charge. At this high-rate charge the cell, assuming initial terminal voltage of 0.8 volt, reaches the predetermined shutoff voltage of 1.55 volts in approximately 5 minutes. At the 1.55 volts terminal voltage the high-rate charge is terminated as follows:

The forward reference diode 5 of the exemplary circuit has a breakdown voltage of approximately 2.0 volts. Thus, the forward reference diode clamps the gate of the silicon controlled rectifier 3 at approximately 2.0 volts. Since the silicon controlled rectifier 3 has been conducting current its temperature has increased to approximately 170° F. so that its gate sensitivity has increased to the point where only approximately 0.4 volt potential difference between the gate and cathode is required to trigger the silicon controlled rectifier 3 on. However, as the charge continues the quiescent terminal voltage of the cell increases so that the silicon controlled rectifier 3 is triggered on later in the cycle of the alternating-current voltage appearing across the secondary 9. As the firing angle increases, less current flows through silicon controlled rectifier 3 so that it begins to cool. As the silicon controlled rectifier 3 cools, its gate sensitivity decreases so that a larger gate potential is required to trigger on the silicon controlled rectifier 3. As a consequence, a regenerative action takes place, The silicon controlled rectifier 3 cools to the point that the gate sensitivity requires a higher voltage than is available and the silicon controlled rectifier will not thereafter turn on and the high-rate charging of the cell is terminated.

Upon termination of high-rate charging the terminal voltage of the cell drifts down to the point that a sufficient difference of potential again appears between the gate and cathode of the silicon controlled rectifier 3 to turn on the silicon controlled rectifier. The silicon controlled rectifier 3 stays off for several minutes while the cell voltage drifts down and then pulses very slowly to provide a trickle charge to the cell.

The charger circuit of FIG. 1 is advantageously operable over a wide range of ambient charger temperatures and input voltage variations. For this purpose, a small-valued resistor 12 is connected in the charge current path and the silicon controlled rectifier 3 and forward reference diode 5 are mounted in thermal proximity to the resistor 12 so that all three elements are at substantially the same ambient temperature. The forward reference diode 5 clamps at a lower voltage as its temperature increases. The silicon controlled rectifier 3 has a higher gate sensitivity as its temperature increases. As a consequence, by mounting the forward reference diode 5, the silicon controlled rectifier 3, and the resistor 12 near each other, the firing angle for the silicon controlled rectifier 3 is temperature-compensated and the average charging current applied to the battery 2 is partially regulated against variations in line voltage. For example, a higher than normal line voltage produces a higher average charging current which in turn yields a high average temperature in resistor 12 and silicon controlled rectifier 3. Heat from these components reaching the forward reference diode 5 causes it to clamp at a lower voltage. This results in delaying the angle at which the silicon controlled rectifier 3 fires, and, in turn, reduces the average charging current. Conversely, at lower line voltages charging current is less, heating of the reference diode 5 by the resistor 12 and silicon controlled rectifier 3 is less, and the clamping voltage at the gate to the silicon controlled rectifier 3 rises. As a result, the firing angle of the silicon controlled rectifier 3 is lowered to yield increasing average charging current.

The charge efficiency of the charger circuit of FIG. 1 is relatively low because a large percentage of the source voltage is dropped across the silicon controlled rectifier 3. However, if the number of cells being charged is increased with a commensurate increase in the voltage of the charging current source, the efficiency may be increased since a smaller percentage of the total voltage drop occurs across the silicon controlled rectifier.

The circuit of FIG. 1 is sensitive to the terminal voltage of the battery for terminating the charge. Other terminal characteristics, such as battery temperature and pressure of the battery, may be employed to indicate the selected state of charge and to determine the time of termination of charge.

Circuits responsive to the battery temperature for terminating charge are shown in FIGS. 2, 3 and 4. In the circuit of FIG. 2, a battery 2 is charged from a source 1 through a silicon controlled rectifier 3 connected between the source and the battery. A resistor 4 is connected between the anode and gate of the silicon controlled rectifier 3 to provide a path for trigger current for the rectifier. A thermistor 10 is connected between the gate of the silicon controlled rectifier 3 and the negative terminal of the battery 2. This thermistor 10 is mounted in thermal proximity of the battery 2 so that it is sensitive to the temperature of the battery. In one nonlimiting embodiment, the thermistor 10 is mounted on one of the clips 11 which connects the battery 2 to the source 1 through silicon controlled rectifier 3.

In one embodiment of charging a ⅛ AA nickel cadmium sealed cell having a nominal voltage of 1.2 volts and a rated capacity of 125 milliampere hours from a 115-volt commercial source a Motorola MCR4071 silicon controlled rectifier was employed. A transformer 8 having a turns ratio of approximately 12:1 coupled the source to the battery through the silicon controlled rectifier. The resistor 4 had a value of 3,000 ohms and the thermistor mounted on the clip 11 had a value of 1,000 ohms at room ambient of approximately 72° F. and a resistance of approximately 100 ohms at 150° F.

As the battery 2 charges, its temperature increases which increase in temperature is sensed by the thermistor 10. This increase in temperature causes the resistance of thermistor 10 to decrease so that less gate current is available at the gate of the silicon controlled rectifier 3. Consequently, the silicon controlled rectifier 3 is caused to conduct later in each cycle so that less current flows through the silicon controlled rectifier 3. As the current through rectifier 3 decreases, the temperature decreases and the gate sensitivity decreases. A regenerative effect takes place such that the decrease in current causes the silicon controlled rectifier 3 to fire later in each cycle because of the decreased gate sensitivity and the increase in battery temperature and decrease in thermistor resistance also causes the silicon controlled rectifier to fire later in each cycle. As a consequence a point is reached where silicon controlled rectifier will not turn on and charging of the battery 2 is terminated.

As an alternative to the circuit of FIG. 2, where only every other half-cycle of input voltage is used, the source 1 may be modified to include full-wave rectification as shown in FIG. 3. The full-wave rectification is accomplished by employing a transformer 15 having a center-tapped secondary 16. Rectifying diode 17 and 18 are connected to the opposite ends of the secondary 16 and the silicon controlled rectifier 3 which functions as a switch, is connected between the battery 2 and the center tap of the secondary 16. By employing full-wave rectification, charge current is applied to the battery during each half-wave so that the battery becomes charged in less time than when half-wave rectification is employed as is done in the circuits of FIGS. 1 and 2.

An alternative circuit for charging a battery is shown in FIG. 4 In the circuit of FIG. 4 a full-wave rectification is provided as in the circuit of FIG. 3. The control circuit for the silicon controlled rectifier 3 operates in a different manner from the control circuits of FIGS. 2 and 3.

In the circuit FIG. 4, a thermistor 20 is connected between the gate of the silicon controlled rectifier 3 and the positive terminal of the battery 2 that is being charged. This thermistor 20 is connected in thermal proximity to the battery 2 being charged. A potentiometer 21 is connected between the anode of the silicon controlled rectifier 3 and the negative terminal of the battery 2. The movable arm or contact of the potentiometer 21 is connected to the gate of the silicon controlled rectifier 3. As the battery temperature increases as charge progresses in battery 2, the resistance of the thermistor 20 decreases. This decrease in resistance of thermistor 20 provides a lower resistance path across the gate-cathode junction of the silicon controlled rectifier 3 causing the silicon controlled rectifier 3 to fire later in each cycle. As a consequence, the regenerative turnoff of the silicon controlled rectifier takes place. Thereafter, as the battery cools and more trigger current is available, the silicon controlled rectifier 3 cycles to apply a trickle charge to the battery.

Various changes may be made in the details of construction without departing from the spirit and scope of the invention as defined in the appended claims.

What is claimed is:

1. A method of charging battery of one or more cells comprising the steps of transmitting direct current pulses to a battery through a continuously operable electrical connection including a controllable unilateral impedance element having a control terminal, and a control sensitivity that increases with the temperature of the element, and decreasing current flow through the controllable element in response to a sensed terminal characteristic of said battery to cause the element to cool and the control sensitivity of the element to decrease to a level where the controllable element will not start conducting.

2. A circuit for charging a battery having at least one cell from a source of charging current pulses, said circuit comprising a current path between the source and the battery to be charged, a unilateral impedance element having a control terminal for the application of a triggering current, said unilateral impedance element being responsive to smaller trigger currents as its temperature increases and larger trigger currents as its temperature decreases, and means for clamping the control terminal at a selected voltage related to the normal output voltage of the battery being charged so that the increase in quiescent battery terminal voltage as charge progresses is compared to the selected voltage and causes the current through the element to decrease with a consequent decrease in the temperature of the element for a regenerative termination of high-rate charging.

3. A battery charging circuit comprising a path for current flow between a source of charge current pulses and a battery to be charged, a controllable unilateral impedance element in said current path for rectifying the alternating current voltage from the source, said unilateral impedance element having a control terminal for controlling the conduction state of the element, a resistor connected between the source and the control terminal, and a circuit for clamping the control terminal of the unilateral impedance element at a predetermined voltage.

4. A circuit in accordance with claim 3 wherein the unilateral impedance element is a silicon controlled rectifier having its anode-cathode path connected between the source and the battery.

5. A battery-charging circuit in accordance with claim 4 wherein the clamping circuit comprises a forward reference diode connected between the gate of the silicon controlled rectifier and the negative terminal of the battery to be charged, with the cathode of the silicon controlled rectifier being connected to the positive terminal of the battery.

6. A circuit in accordance with claim 3 wherein the clamping circuit comprises a forward reference diode connected between the control terminal of the unilateral impedance element and the negative terminal of the battery to be charged.

7. A battery-charging circuit in accordance with claim 3 further including a transformer having a center-tapped secondary with the primary of the transformer being connected to the source, said unilateral impedance element is a silicon controlled rectifier having its anode-cathode path connected between the center tap of the secondary of said transformer and the positive terminal of the battery to be charged.

8. A battery-charging circuit in accordance with claim 7 further including a forward reference diode connected between the gate of the silicon controlled rectifier and the negative terminal of the battery to be charged.

9. A battery-charging circuit in accordance with claim 3 wherein the clamping circuit comprises a forward reference diode connected between the control terminal and the negative terminal of the battery to be charged, the unilateral impedance element having a control terminal sensitivity such that a larger trigger current is required for lower temperatures of the element, with the forward reference diode clamping the control terminal at a higher voltage with a decrease in temperature of the diode with the diode and unilateral impedance element being connected in thermal contact to provide temperature compensation for the circuit.

10. The method of charging a battery having one or more cells comprising the steps of applying charge current pulses through a silicon controlled rectifier connected between a charging source and the battery to be charged and causing less current to flow through the silicon controlled rectifier as the battery terminal voltage increases as charge progresses so that the silicon controlled rectifier cools and its gate sensitivity increases above the available gate trigger current so that the silicon controlled rectifier is no longer gated on.

11. A circuit for charging a battery having at least one cell from a source of alternating current voltage, said circuit comprising a transformer having a center-tapped secondary, means for connecting the primary of said transformer to said source, a silicon controlled rectifier having its anode-cathode path connected between the center tap of the secondary of the transformer and the positive terminal of the battery to be charged, a resistor connected between the anode and gate of said rectifier, a first unilateral impedance element connected between the negative terminal of the battery to be charged and one end terminal of the secondary of said transformer, a second unilateral impedance element connected between the negative terminal of the battery to be charged and the other end terminal of the secondary of said transformer; a thermistor connected between the gate terminal of said silicon controlled rectifier and the negative terminal of the battery to be charged with the thermistor being mounted in thermal proximity to the battery to be charged so that its is responsive to the temperature of the battery being charged.

12. A circuit for charging a battery having at least one cell from a source of alternating current voltage, said circuit comprising a transformer having a center-tapped secondary, means for connecting the primary of said transformer to said source, a silicon controlled rectifier having its anode-cathode path connected between the center tap of the secondary of the transformer and the positive terminal of the battery to be charged, a first unilateral impedance element connected between the negative terminal of the battery to be charged and one end terminal of the secondary of said transformer, a second unilateral impedance element connected between the negative terminal of the battery to be charged and the other end terminal of the secondary of said transformer; a thermistor connected between the gate of said silicon controlled rectifier and the positive terminal of the battery to be charged, with the thermistor being mounted in thermal proximity to the battery to be charged so that it is responsive to the temperature of the battery being charged, a potentiometer being connected between the anode of said silicon controlled rectifier to the variable arm of said potentiometer.

13. A circuit for charging a battery having at least one cell from a source of charging current pulses, said circuit comprising a current path between the source and the battery to be charged, a silicon controlled rectifier connected in said path with its anode being connected to the source and its cathode being connected to the positive terminal of the battery to be charged; said silicon controlled rectifier being responsive to smaller trigger currents as its temperature increases and to larger trigger current as its temperature decreases, a resistor connected between the anode and gate of said rectifier, and a forward reference diode connected between the gate of said rectifier and the negative terminal of the battery to be charged for clamping the gate a predetermined voltage.

14. A circuit for charging a battery having at least one cell from a source of charging current pulses, said circuit comprising a current path between the source and the battery to be charged, a silicon controlled rectifier connected in said path with the anode of said rectifier being connected to the source and the cathode of said rectifier being connected to the positive terminal of the battery to be charged, said rectifier being responsive to smaller trigger currents as its temperature increases and to larger currents as its temperature decreases; a resistor connected between the anode and gate of said rectifier; and a thermistor connected between the gate of said rectifier and the negative terminal of the battery to be charged and mounted in thermal proximity to the battery to be charged so that it is responsive to the temperature of the battery while the battery is being charged.

PO-1050
(5/69)

UNITED STATES PATENT OFFICE
CERTIFICATE OF CORRECTION

Patent No. 3,614,584           Dated October 19, 1971

Inventor(s) Wilford B. Burkett, John H. Bigbee, III

It is certified that error appears in the above-identified patent and that said Letters Patent are hereby corrected as shown below:

Cover page, Item [73] correct the spelling of McCulloch

Column 4, line 61, change "of" to --to--
" 4, " 66, change "of" to --for--
" 4, " 69, change "MCR4071" to --MCR407-1--

Column 5, line 36, after "circuit" insert --of--.
" 5, " 57, change "in" to --by--
" 5, " 72, after "element" insert --connected in said path, said unilateral impedance element--

Column 7, line 8, correct the spelling of "it".
" 7, " 30, after "rectifier" insert --and the negative terminal of the battery to be charged, and means connecting the gate of said silicon controlled rectifier--

Column 8, line 13, after "gate" insert --at--
" 8, line 22, after "larger" insert --trigger--

Signed and sealed this 18th day of April 1972.

(SEAL)
Attest:

EDWARD M.FLETCHER,JR.          ROBERT GOTTSCHALK
Attesting Officer                  Commissioner of Patents